United States Patent
Chen et al.

(10) Patent No.: US 11,741,092 B2
(45) Date of Patent: Aug. 29, 2023

(54) METHOD AND APPARATUS FOR PROVIDING BIG DATA ANALYSIS SERVICE, AND COMPUTER READABLE STORAGE MEDIUM

(71) Applicant: ZTE CORPORATION, Shenzhen (CN)

(72) Inventors: Lin Chen, Shenzhen (CN); Zhongyi Cao, Shenzhen (CN); Chunxiao Wang, Shenzhen (CN); Fangting Zheng, Shenzhen (CN); Xiliang Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 437 days.

(21) Appl. No.: 16/627,987

(22) PCT Filed: Sep. 18, 2018

(86) PCT No.: PCT/CN2018/106162
§ 371 (c)(1),
(2) Date: Dec. 31, 2019

(87) PCT Pub. No.: WO2019/057027
PCT Pub. Date: Mar. 28, 2019

(65) Prior Publication Data
US 2020/0218715 A1    Jul. 9, 2020

(30) Foreign Application Priority Data

Sep. 22, 2017  (CN) .......................... 201710868202.1

(51) Int. Cl.
*G06F 15/16*  (2006.01)
*G06F 16/245*  (2019.01)
(Continued)

(52) U.S. Cl.
CPC ......... *G06F 16/245* (2019.01); *G06Q 20/085* (2013.01); *G06Q 20/127* (2013.01);
(Continued)

(58) Field of Classification Search
CPC .. G06F 16/245; G06Q 20/085; G06Q 20/127; G06Q 30/0201; H04L 12/14;
(Continued)

(56) References Cited

U.S. PATENT DOCUMENTS

2015/0127646 A1*  5/2015  Shaw .................... G06F 16/254
                                                      707/736
2018/0167476 A1*  6/2018  Hoffner .................. H04L 67/55
(Continued)

FOREIGN PATENT DOCUMENTS

CN        106162745 A      11/2016
CN        107113529 A       8/2017
WO    WO 2019/057027 A1     3/2019

OTHER PUBLICATIONS

Ericsson, "23.502: Network Internal Exposure in Service Based Architecture", SA WG2 Meeting #210, S2-17-2357, Mar. 27-31, 2017 in 6 pages.

(Continued)

*Primary Examiner* — Karen C Tang
(74) *Attorney, Agent, or Firm* — Knobbe, Martens, Olson & Bear, LLP

(57) ABSTRACT

Provided are a method and apparatus for providing a big data analysis service, and a computer readable storage medium. The method for providing a big data analysis service includes: generating, by network data analytics, big data information according to network operation and maintenance data, and sending the big data information to an application through a network exposure function.

16 Claims, 7 Drawing Sheets

(51) Int. Cl.
*G06Q 20/08* (2012.01)
*G06Q 20/12* (2012.01)
*G06Q 30/0201* (2023.01)
*H04L 12/14* (2006.01)
*H04L 41/14* (2022.01)
*H04L 41/0246* (2022.01)
*H04L 41/00* (2022.01)
*H04L 43/04* (2022.01)
*H04L 43/062* (2022.01)
*H04L 43/12* (2022.01)
*G06F 15/173* (2006.01)

(52) U.S. Cl.
CPC ......... *G06Q 30/0201* (2013.01); *H04L 12/14* (2013.01); *H04L 41/0246* (2013.01); *H04L 41/14* (2013.01); *H04L 41/24* (2013.01); *H04L 43/04* (2013.01); *H04L 43/062* (2013.01); *H04L 43/12* (2013.01)

(58) Field of Classification Search
CPC ..... H04L 41/0246; H04L 41/14; H04L 41/24; H04L 43/04; H04L 43/062; H04L 43/12; H04L 12/1407; H04L 12/1453; H04L 12/1485; H04L 69/24; H04L 67/16; H04M 15/66; H04M 15/80; H04M 15/8022; H04M 15/8083; H04M 15/82; H04M 15/8207; H04M 15/8214; H04M 15/8228; H04W 88/18; H04W 8/10; H04W 24/04; H04W 8/20
USPC .......................................................... 709/224
See application file for complete search history.

(56) References Cited

U.S. PATENT DOCUMENTS

2018/0183855 A1* 6/2018 Sabella ............. H04W 52/0264
2018/0285166 A1* 10/2018 Roy ....................... G06F 9/5016
2018/0376446 A1* 12/2018 Youn ....................... H04W 8/20

OTHER PUBLICATIONS

"3$^{rd}$ Generation Partnership Project; Technical Specification Group Services and System Aspects; System Architecture for the 5G System; Stage 2 (Release 15)", 3GPP TS 23.501 V0.3.0, Feb. 2017 in 97 pages.
First Office Action of Chinese Patent Application No. 201710868202.1, dated Dec. 2, 2021, in 8 pages.
First Search Report of Chinese Patent Application No. 201710868202.1, dated Nov. 16, 2021 in 3 pages.
Interdigital Inc. et al.,. "Clarification on Scope and Access to NWDA," 1-24 3GPP TSG-SA WG2 Meeting #121, S2-173429, May 19, 2017 (May 19, 2017), sections 4.2.3, A.I, 2.1 and A.3.1.10.
China Mobile,. "23.502 Editorial Change on 23.502 on NF Services," 1-24 SA WG2 Meeting #122£, S2-176794, Sep. 15, 2017 (Sep. 15, 2017), entire document.
Nokia et al.,. "Update to the PCC Architecture and the Description of PCEF with the 1-24 Clarification of PCEF Distribution," SA WG2 Meeting #120, S2-171886, Mar. 31, 2017 (Mar. 31, 2017), entire document.
Nov. 22, 2018 International Search Report from related PCT/CN2018/106162.

* cited by examiner

METHOD AND APPARATUS FOR PROVIDING BIG DATA ANALYSIS SERVICE, AND COMPUTER READABLE STORAGE MEDIUM

CROSS-REFERENCES TO RELATED APPLICATIONS

This is a National Stage Application, filed under 35 U.S.C. 371, of International Patent Application No. PCT/CN2018/106162, filed on Sep. 18, 2018, which claims priority to a Chinese patent application No. 201710868202.1 filed on Sep. 22, 2017, disclosure of which is incorporated herein by reference in its entirety.

TECHNICAL FIELD

The present application relates to a communication network, for example, to a method and apparatus for providing a big data analysis service, and a computer-readable storage medium in a mobile communication network.

BACKGROUND

FIG. 1 is a structural diagram of a 3rd generation partnership project (3GPP) evolved packet system. As shown in FIG. 1, the 3GPP evolved packet system (EPS) includes an evolved universal terrestrial radio access network (E-UTRAN), a mobility management entity (MME), a serving gateway (S-GW), a packet data network gateway (PDN GW or P-GW), a home subscriber server (HSS), a policy and charging rules function (PCRF) and other support nodes including an authentication, authorization and accounting (AAA) server, which is not shown in FIG. 1, in the 3GPP.

In recent years, mobile Internet is developed vigorously, and various applications (APPs) emerge one after another. Especially, with the popularization of artificial intelligence and big data applications, many APPs, such as instant messaging, live videos and bicycle sharing, have demands for a network big data analysis, fine operation and maintenance, and improvement of subscriber stickiness. If each APP is separately provided with a set of big data analysis system, the APP has too high a threshold to obtain operation data of multiple network elements of a core network and waste plenty of resources and bandwidth.

SUMMARY

The following is a summary of the subject matter described herein in detail. This summary is not intended to limit the scope of the claims.

An embodiment of the present application provides a method and apparatus for providing a big data analysis service, and a computer-readable storage medium to provide big data information for an application.

At least one embodiment of the present application provides a method for providing a big data analysis service. The method includes steps described below. Network data analytics generates big data information according to network operation and maintenance data, and sends the big data information to an application through a network exposure function.

An embodiment of the present application provides an apparatus for providing a big data analysis service. The apparatus for providing a big data analysis service includes a big data information management unit and a sending unit. The big data information management unit is configured to generate big data information according to network operation and maintenance data. The sending unit is configured to send the big data information to an application through a network exposure function. In an embodiment, the big data information includes at least one of cell-level information, subscriber-level information, session-level information or a subscriber mobility rule.

An embodiment of the present application provides a method for providing a big data analysis service. The method includes steps described below. A network exposure function receives big data information generated by network data analytics according to network operation and maintenance data, and sends the big data information to an application.

An embodiment of the present application further provides an apparatus for providing a big data analysis service. The apparatus includes a receiving unit and a sending unit. The receiving unit is configured to receive big data information generated by network data analytics according to network operation and maintenance data. The sending unit is configured to send the big data information to an application.

An embodiment of the present application provides an apparatus for providing a big data analysis service. The apparatus includes a memory and a processor, where the memory stores a program which, when read and executed by the processor, implements the method for providing a big data analysis service described above.

An embodiment of the present application provides a computer-readable storage medium storing at least one program, where the at least one program is executable by at least one processor for implementing the method for providing a big data analysis service described above.

Other aspects can be understood after the drawings and the detailed description are read and understood.

BRIEF DESCRIPTION OF DRAWINGS

The drawings are provided for a further understanding of the technical solutions of the present application, and constitute a part of the specification. The drawings and the embodiments of the present application are used to explain the technical solutions of the present application, and not intended to limit the technical solutions of the present application.

DETAILED DESCRIPTION

Embodiments of the present application will be described hereinafter in detail with reference to the drawings. The steps illustrated in the flowcharts among the drawings may be executed by a computer system such as a group of computers capable of executing instructions. In addition, although logical sequences are shown in the flowcharts, the illustrated or described steps may be executed in sequences different from those described herein in some cases.

Figure 1:
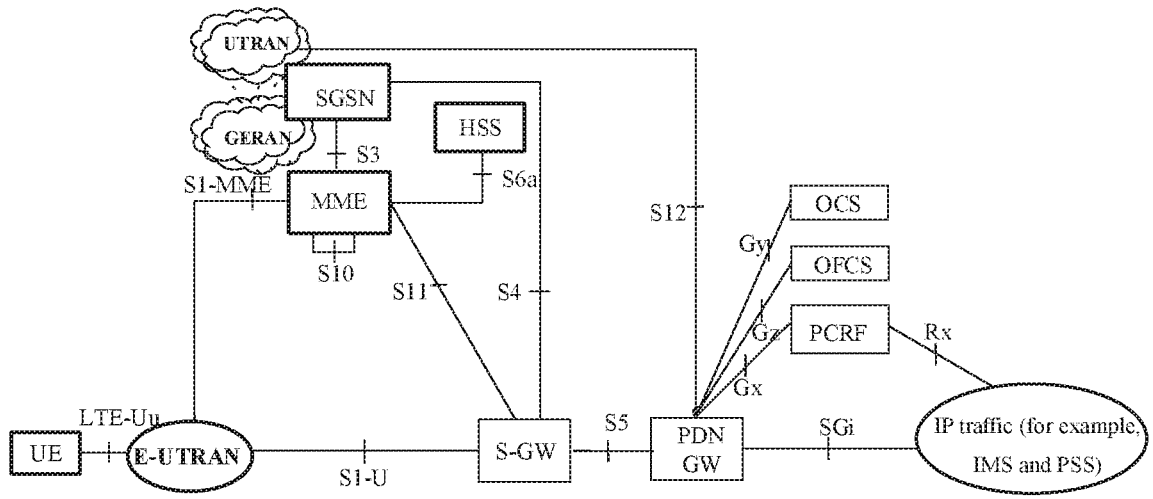
FIG. 1 is a diagram of a related EPS network architecture.
Figure 2:
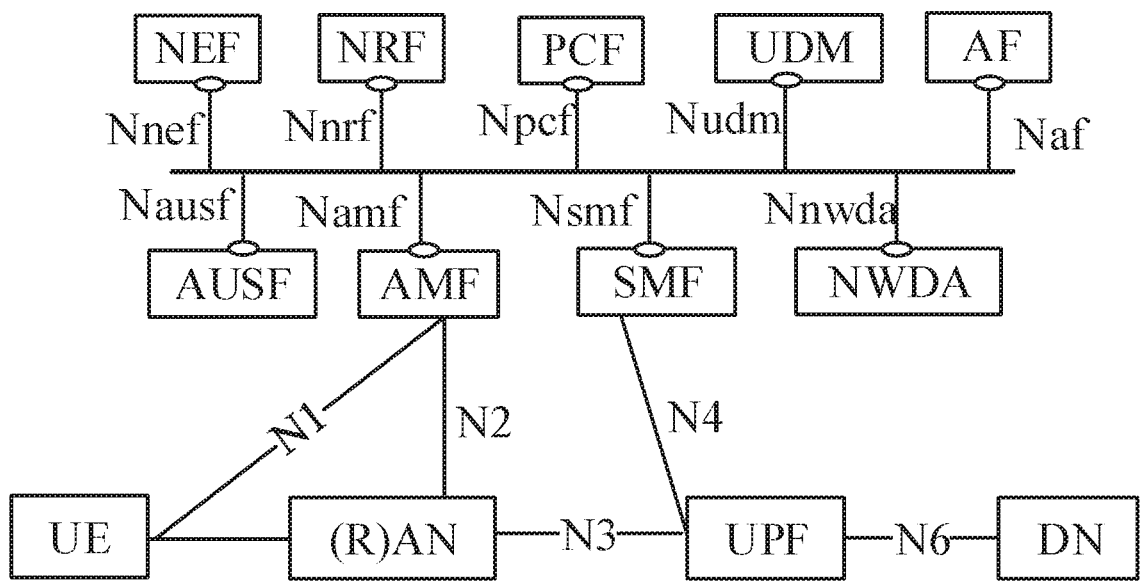
FIG. 2 is a diagram of a future 5G network architecture.

FIG. 2 is a diagram of a future 5G network architecture. As shown in FIG. 2, two brand new network service units are introduced in the network architecture: a network exposure function and network data analytics.

A network exposure function (NEF) is used as a logical entity for capability exposure in a system to enable internal or external applications to access information or traffic provided by a network and provided customized network capabilities for different usage scenarios.

Network data analytics (NWDA) is a logical function for managing network analyses under the management of an operator.

However, 3GPP merely defines that the NWDA has a network layer operation and maintenance data analysis capability and an interface with a policy control function (PCF), and thus the NWDA cannot expose the capability and flexibly provide a customized big data service for an Internet third party APP.

Figure 3:
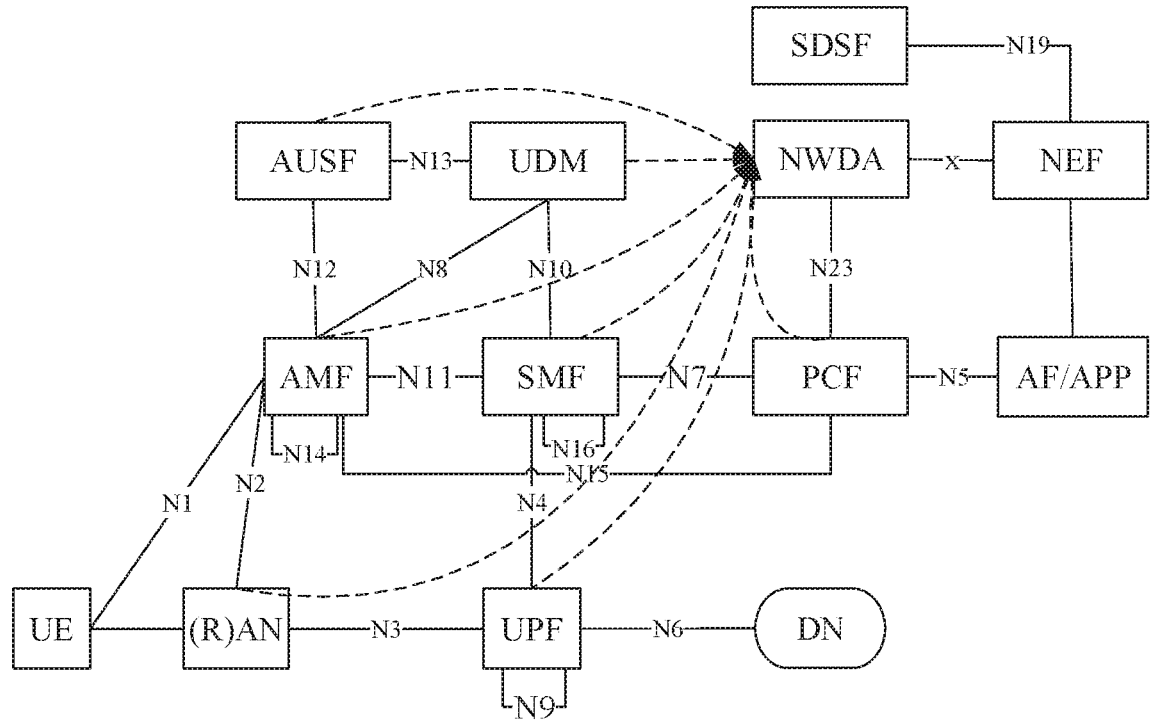
FIG. 3 shows a architecture for providing a next-generation big data service according to an embodiment of the present application.

As shown in FIG. 3, in an embodiment of the present application, an x interface is newly added between the NWDA and the NEF, where the x interface may be implemented based on an Nnef service interface or implemented by a point-to-point protocol. The NWDA may separately provide different big data analysis capabilities or serve different areas as a plurality of independent systems, or separately provide different big data analysis capabilities or serve different areas in a cluster mode.

Figure 4:
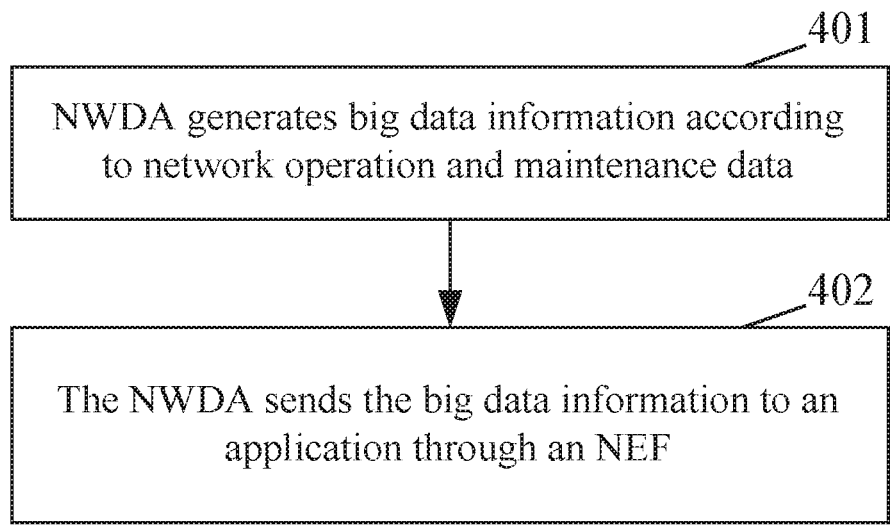
FIG. 4 is a flowchart of a method for providing a big data analysis service according to an embodiment of the present application.

An embodiment of the present application provides a method for providing a big data analysis service. As shown in FIG. 4, the method includes step 401 and step 402.

In step 401, network data analytics (NWDA) generates big data information according to network operation and maintenance data.

In step 402, the NWDA sends the big data information to an application through a network exposure function (NEF).

In an embodiment, the NWDA acquires the network operation and maintenance data from the NEF, or the NWDA acquires the network operation and maintenance data from a plurality of network functions. The network operation and maintenance data may be acquired from the network functions by sending a request for subscribing to a network element operation message to the plurality of network functions. Of course, since the plurality of network functions report the network operation and maintenance data to the NEF, the NWDA may also directly acquire the network operation and maintenance data from the NEF.

The big data information includes at least one of cell-level information, subscriber-level information, session-level information or a subscriber mobility rule. The cell-level information includes at least one of an access density or the number of online subscribers. The cell-level information facilitates APP matching application deployment. The subscriber-level information includes at least one of a subscriber position, reachability, a roaming status, a connection loss or a traffic habit. The subscriber-level information may be used for accurate advertisement delivery. The session-level information includes a session address, duration, a quality of service (QoS), a maximum rate limit, user port function (UPF) information and the like. The session-level information may be used for APP adaptation or local off-loading. The subscriber mobility rule facilitates customized traffic development, or serves as a crowd probability analysis, crowd optimization and other applications in hot spot areas (such as shopping malls and playgrounds). It is to be noted that the big data information mentioned above is merely an example, and the present application is not limited thereto.

In an embodiment, the application may subscribe to big data traffic from the NWDA or cancel a big data traffic subscription, and then the NWDA sends the big data information of the big data traffic subscribed to by a subscriber to the application. For example, the method further includes steps described below. The NWDA receives a big data traffic subscription request or a cancellation subscription request which is forwarded by the NEF from the application, and records or updates the big data traffic subscribed to by the application according to information about the big data traffic carried in the big data traffic subscription request or cancellation subscription request.

In an embodiment, the step in which the NWDA sends the big data information to the application through the NEF includes a step described below. The NWDA determines that the big data information matches with the big data traffic subscribed to by the application, and sends the big data information to the application through the NEF.

The big data traffic subscribed to by the application may be that the NWDA is required to periodically return the big data information or return the big data information to the application after a certain trigger condition is met, or that the APP subscribes to an event, and the APP is notified when the corresponding event is generated. The NWDA may periodically return the big data information to the application, or the NWDA may return the big data information to the application after the trigger condition is met. For example, the APP is notified in case of network congestion.

In another embodiment, the NWDA may also return the big data information to the application after receiving a query request from the application. That is to say, the NWDA receives the query request sent by the application through the NEF, and sends the big data information requested to be queried by the application to the application through the NEF. That is, the NWDA may send the big data information to the APP when the APP performs an active query, or send the big data information to the APP when the APP subscribes to related traffic. For example, some big data traffic may also be actively sent to the APP by the NWDA as a service provided by the network without a subscription. Specific modes may be set as required.

Figure 5:
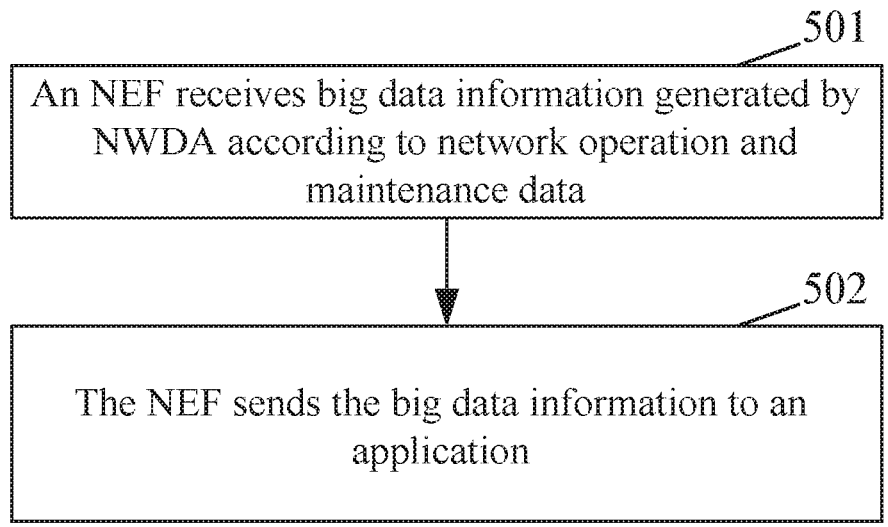
FIG. 5 is a flowchart of a method for providing a big data analysis service according to another embodiment of the present application.

An embodiment of the present application provides a method for providing a big data analysis service. As shown in FIG. 5, the method includes step 501 and step 502.

In step 501, an NEF receives big data information generated by NWDA according to network operation and maintenance data.

In step 502, the NEF sends the big data information to an application.

In an embodiment, the NEF receives a big data traffic subscription request from the application, and sends the big data traffic subscription request to the NWDA. The big data traffic subscription request carries data traffic information. When a plurality of NWDA exist, the NEF further needs to select NWDA from the plurality of NWDA according to information about big data traffic in the big data traffic subscription request, and send the big data traffic subscription request to the selected NWDA.

In an embodiment, the NEF receives a cancellation subscription request from the application, and sends the cancellation subscription request to the NWDA. The cancellation subscription request carries the data traffic information. In another embodiment, after the NEF receives the cancellation subscription request, if no other application subscribes to the big data traffic requested to be cancelled in the cancellation subscription request, the NEF carries a big data traffic cancellation indication in the cancellation subscription request sent to the NWDA to instruct the network data analytics to uninstall a corresponding traffic analysis module.

In an embodiment, the NEF further receives a query request sent by the application, forwards the query request to the NWDA, and receives the big data information corresponding to the query request and returned by the NWDA. That is, the step in which the NEF receives the big data information generated by the NWDA according to the network operation and maintenance data includes steps described below. The NEF receives the query request sent by the application, where the query request carries big data traffic information to be queried by the application. The NEF forwards the query request to the NWDA and receives the big data information corresponding to the query request and returned by the NWDA.

In an embodiment, the method further includes a step describe below. The NEF performs charging when the NEF sends the big data information to the application. A charging mode may be charging by duration, charging by times, or other charging modes. For example, when the charging is performed, some big data traffic may be charged and some big data traffic may be free of charge. In addition, preferential charging and the like may be performed for some big data traffic.

In the present application, after obtaining the big data information, the APP may dynamically adjust a picture resolution or a video definition according to a network congestion condition, or provide a service position according to the network congestion condition, thereby reducing network loads, provide better subscriber experience and achieving a win-win result.

The implementation of the technical solutions is described in detail with reference to the drawings. In the following embodiments, it is presupposed that an NWDA big data platform of an operator has been deployed, NWDA may acquire operation data of a plurality of network functions (NFs) in a core network and perform a corresponding analysis, and an NEF may provide a capability exposure interface to the outside.

Figure 6:
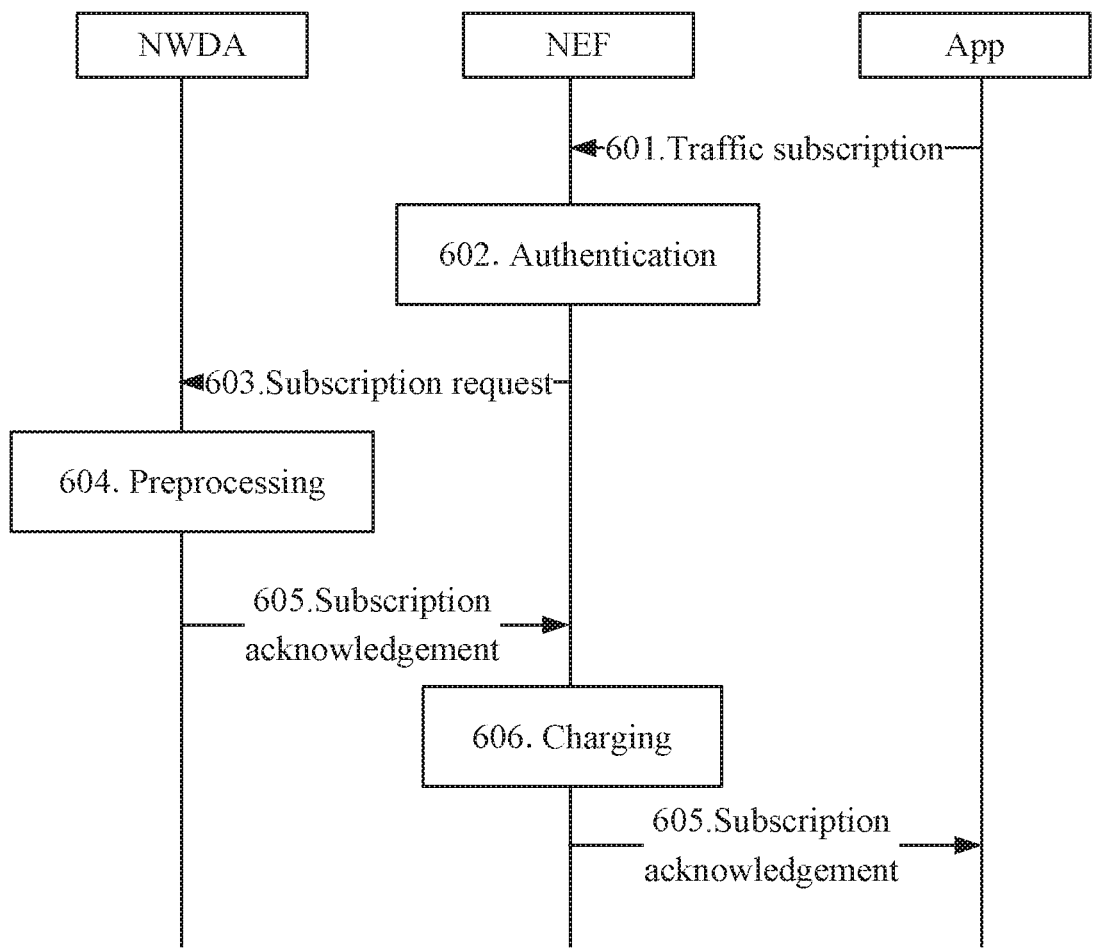
FIG. 6 is a flowchart of a traffic subscription initiated by an APP according to an embodiment of the present application.

FIG. 6 is a flowchart of a traffic subscription initiated by an APP according to an embodiment of the present application. As shown in FIG. 6, the flow includes step 601 to step 607.

In step 601, the APP initiates a subscription request carrying a traffic parameter.

The traffic parameter is information on big data traffic, such as a network congestion notification and a subscriber traffic status, and carries area information or subscriber information.

In step 602, after receiving a traffic subscription request, the NEF performs security authentication and determines whether the traffic subscription request has been registered. If the traffic subscription request has been registered, step 606 is directly performed; otherwise, step 603 is performed.

In step 603, the NEF selects appropriate NWDA according to the traffic parameter and initiates a big data traffic subscription request to the NWDA.

In step 604, the NWDA records subscription information, determines whether a new type of data needs to be acquired, and adds a corresponding analysis module.

In step 605, the NWDA returns a subscription acknowledgement message to the NEF.

In step 606, the NEF determines whether the subscription is successful, and if it is successful, the NEF generates event charging.

In step 607, the NEF returns the subscription acknowledgement message to the APP.

In the embodiment described above, in step 601, the APP may carry a plurality of traffic parameters to subscribe to a plurality of traffic requests once.

It is to be noted that the generation of the event charging in step 606 may not be performed, for example, when the big data traffic is free, no charging is required. In addition, the NEF may also generate the event charging after it returns the subscription acknowledgement message to the APP. The specific implementation of charging may refer to the implementation of charging of other traffic in the related art, which is not limited in the present application.

Figure 7:
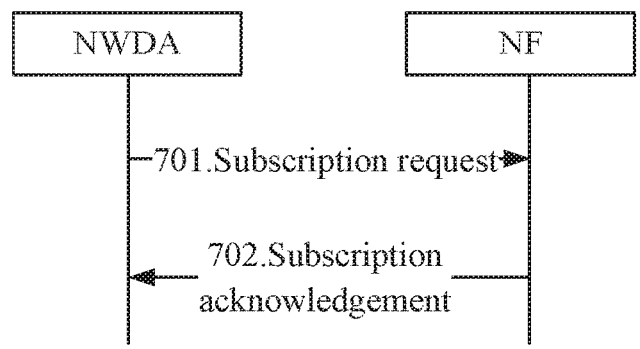
FIG. 7 is a flowchart in which NWDA subscribes to network information from a plurality of network functions according to an embodiment of the present application.

FIG. 7 is a flowchart in which NWDA subscribes to network and subscriber process messages from a plurality of NFs according to an embodiment of the present application. As shown in FIG. 7, the flow includes step 701 and step 702.

In step 701, the NWDA sends a request for subscribing to a network element operation message to the plurality of NFs, where the request carries a slice or traffic identification information.

Network slicing refers to dividing a network into a plurality of virtual networks, and each slice corresponds to one virtual network. Carrying the slice means carrying corresponding virtual network identification information.

In step 702, the plurality of NFs process the request for subscribing to the network element operation message and send a subscription acknowledgment response message.

After the NWDA subscribes to the network element operation message from the plurality of NFs, the plurality of NFs send network operation and maintenance data to the NWDA.

In another embodiment, the NWDA directly subscribes to the network operation and maintenance data of the plurality of NFs from the NEF, and the NEF sends the network operation and maintenance data to the NWDA. The network operation and maintenance data may be actively sent by the NEF, or may be sent after the NWDA requests the network operation and maintenance data from the NEF. In this implementation, each NF merely needs to report one piece of data to the NEF, reducing reporting loads.

Figure 8:
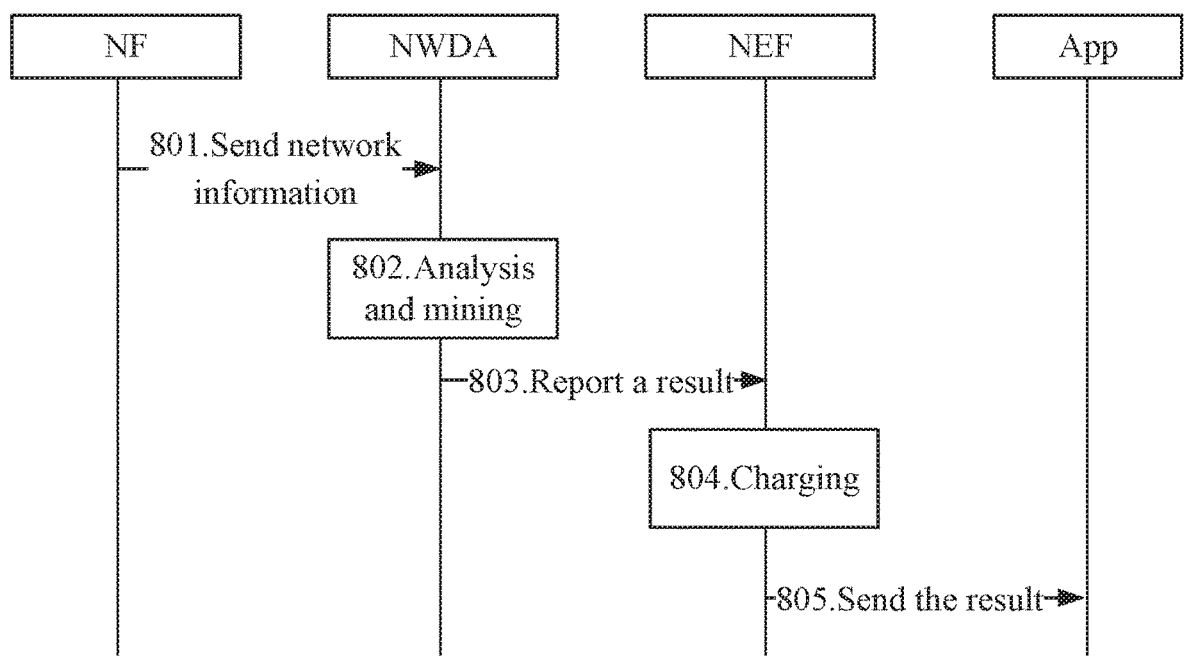
FIG. 8 is a flowchart in which NWDA sends traffic information to an APP according to an embodiment of the present application.

FIG. 8 is a flowchart of reporting of NWDA data or notification according to an embodiment of the present application. As shown in FIG. 8, the flow includes step 801 to step 805.

In step 801, an NF reports network operation and maintenance data, such as network operation log information, to the NWDA.

In step 802, the NWDA performs a big data analysis according to the network operation and maintenance data, acquires big data information, and finds a subscription entry that matches with an application.

For example, an APP subscribes to network congestion information. The current big data information includes the network congestion information, that is, the subscription entry that matches with the application.

In step 803, the NWDA reports the matched big data information to the NEF.

In step 804, the NEF completes event charging.

In step 805, the NEF sends the matched big data information to the APP.

For example, the big data information is the network congestion information, and a certain APP subscribes to the network congestion information. At this time, the NEF sends the network congestion information to the APP.

Figure 9:
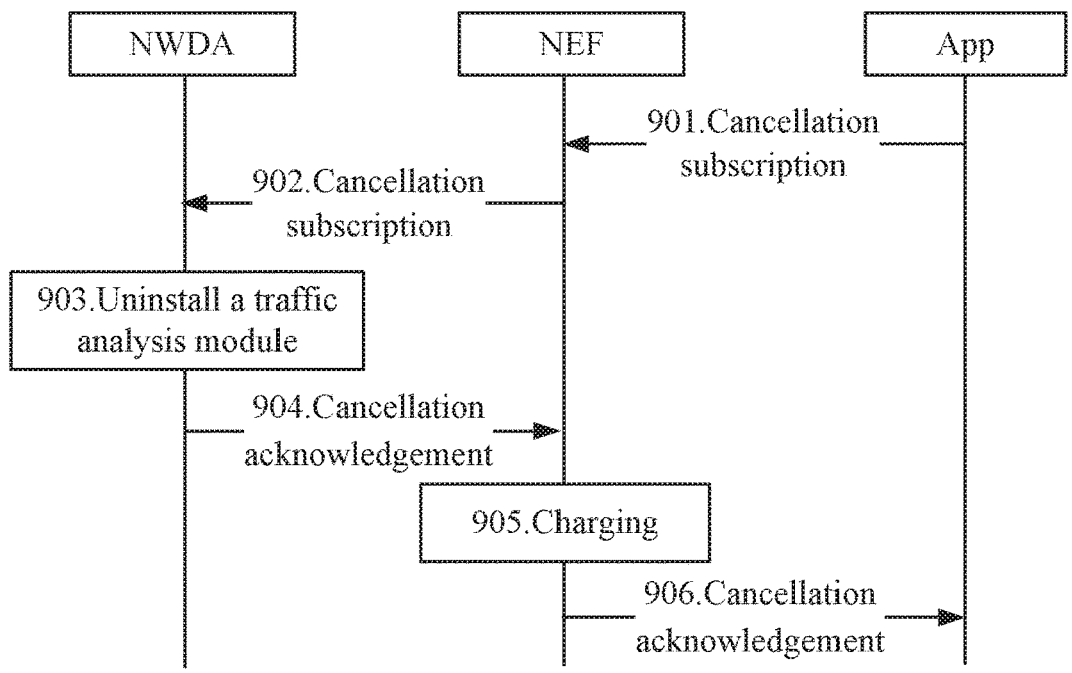
FIG. 9 is a flowchart of traffic cancellation initiated by an APP according to an embodiment of the present application.

FIG. 9 is a flowchart of a cancellation subscription of an APP according to an embodiment of the present application. As shown in FIG. 9, the flow include step 901 to step 906.

In step 901, the APP initiates a cancellation subscription request to the NEF. The cancellation subscription request carries a traffic parameter.

The traffic parameter includes information about big data traffic to be cancelled by the APP, and may include information about one or more pieces of big data traffic.

In step 902, the NEF sends the cancellation subscription request to the NWDA.

If it is found that no APP subscribes to the traffic, the cancellation subscription request further carries a big data traffic cancellation indication to instruct the NWDA to uninstall a corresponding traffic analysis module.

In step 903, the NWDA updates big data traffic subscription information of the APP after receiving the cancellation subscription request.

If the cancellation subscription request further carries the big data traffic cancellation indication, the corresponding traffic analysis module is uninstalled.

It is to be noted that in step 902, the big data traffic cancellation indication may not be carried, and the NWDA determines itself that no APP subscribes to certain traffic and uninstalls a traffic analysis module corresponding to the certain traffic.

In step 904, the NWDA returns a traffic cancellation acknowledgment response to the NEF.

In step 905, the NEF performs a charging operation and triggers an event charging message.

In an embodiment, if charging is performed by duration, the charging needs to be stopped.

In step 906, the NEF sends a cancellation acknowledgment response message to the APP.

Figure 10:
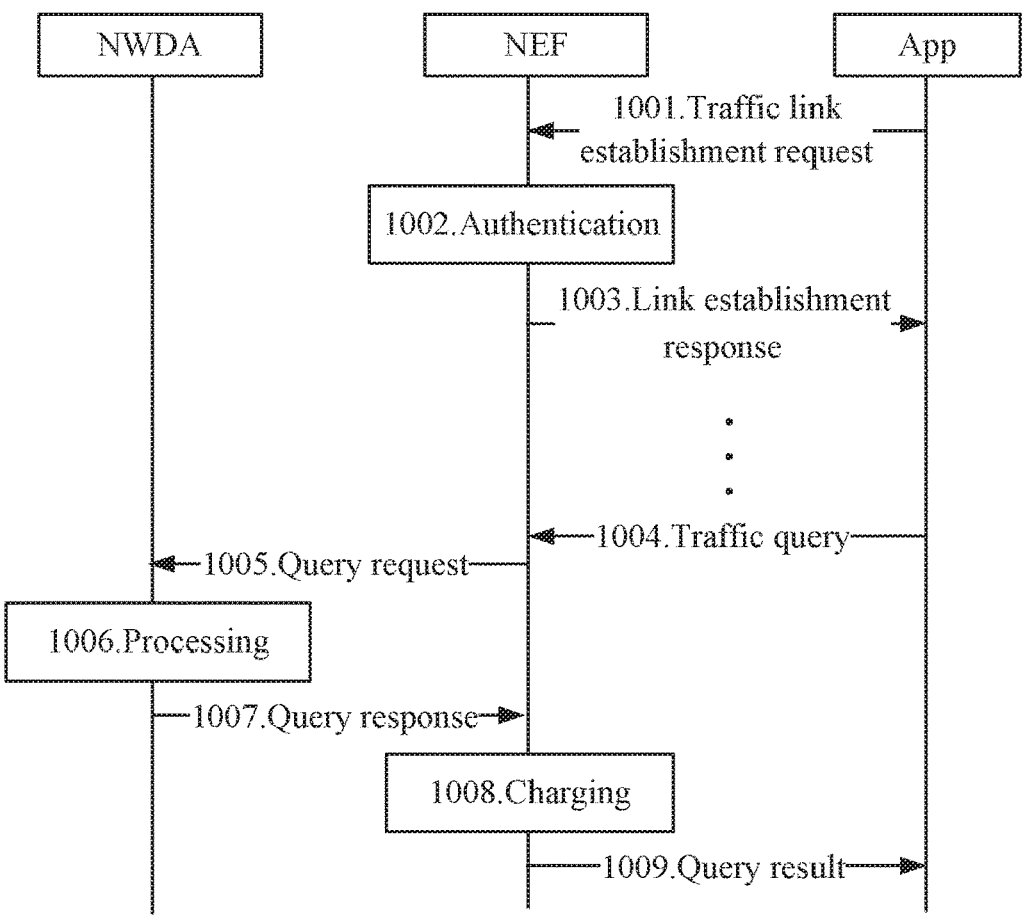
FIG. 10 is a flowchart of a traffic query actively initiated by an APP according to an embodiment of the present application.

FIG. 10 is a flowchart of a traffic query actively initiated by an APP according to an embodiment of the present application. As shown in FIG. 10, the flow includes step 1001 to step 1009.

In step 1001, the APP initiates a traffic link establishment request which carries its identity information to the NEF.

In step 1002, after receiving the traffic link establishment request, the NEF performs authentication and determines whether an access of the APP is allowed.

In step 1003, if the access of the APP is allowed, the NEF returns a traffic link establishment response to the APP. The traffic link establishment response carries link information and service duration.

In another embodiment, the APP may skip steps 1001 and 1002 and directly initiate a query request and carry the identity information to the NEF.

In step 1004, when necessary, the APP initiates the query request carrying a service parameter to the NEF.

The traffic parameter is information about big data traffic and indicates the big data traffic to be queried by the APP.

In step 1005, after receiving the query request, the NEF selects appropriate NWDA and forwards the query request to the corresponding NWDA.

In an embodiment, if the NWDA capable of providing a service cannot be selected, step 1009 is directly performed. A query failure result is returned and a failure reason is prompted to the APP.

In step 1006, after receiving the query request, the NWDA queries its own database, retrieves a result, or makes an analysis and a decision on whether data needs to be re-mined.

In step 1007, the NWDA reports a query response to the NEF.

In step 1008, after receiving the query response, the NEF performs a charging operation and triggers an event charging message.

In an embodiment, if charging is performed by duration, the charging needs to be stopped.

In step 1009, the NEF sends a query result to the APP.

Figure 11:
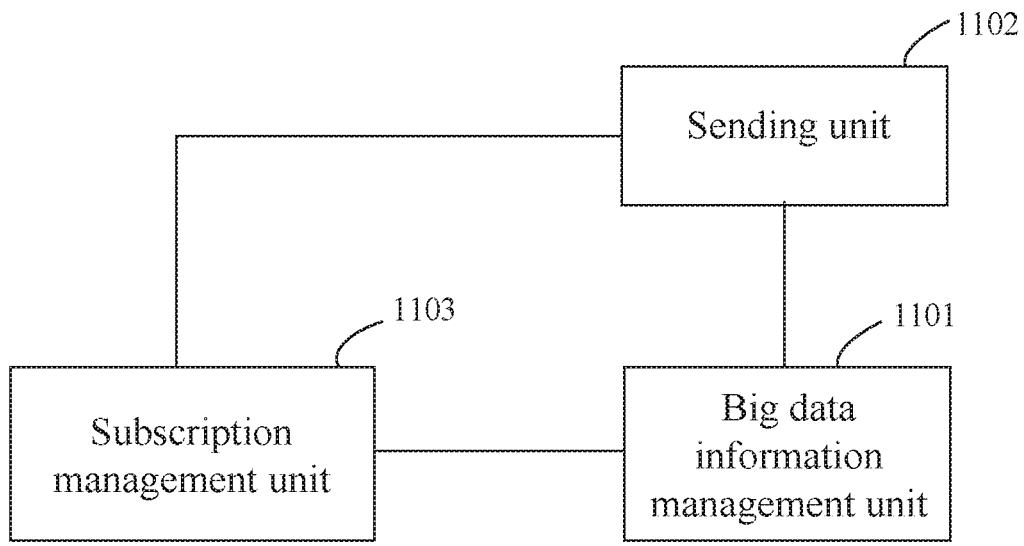
FIG. 11 is a block diagram of an apparatus for providing a big data analysis service according to an embodiment of the present application.

An embodiment of the present application provides an apparatus for providing a big data analysis service. As shown in FIG. 11, the apparatus includes a big data information management unit 1101, a sending unit 1102 and a subscription management unit 1103.

The big data information management unit 1101 is configured to generate big data information according to network operation and maintenance data.

The sending unit 1102 is configured to send the big data information to an application through an NEF.

In an embodiment, the apparatus for providing a big data analysis service further includes the subscription management unit 1103. The subscription management unit 1103 is configured to receive a big data traffic subscription request or a cancellation subscription request which is forwarded by the network exposure function from the application, and record or update big data traffic subscribed to by the application according to information about the big data traffic carried in the big data traffic subscription request or the cancellation subscription request.

In an embodiment, the big data information management unit 1101 is further configured to acquire the network operation and maintenance data from the network exposure function, or acquire the network operation and maintenance data from a plurality of network functions.

In an embodiment, the sending unit 1102 is configured to send the big data information to the application through the network exposure function in a mode described below. A query request sent by the application through the network exposure function is received, and the big data information requested to be queried by the application is sent to the application through the network exposure function. Alternatively, it is determined that the big data information matches with the big data traffic subscribed to by the application, and the big data information is sent to the application through the network exposure function.

The apparatus may be disposed on NWDA.

Figure 12:
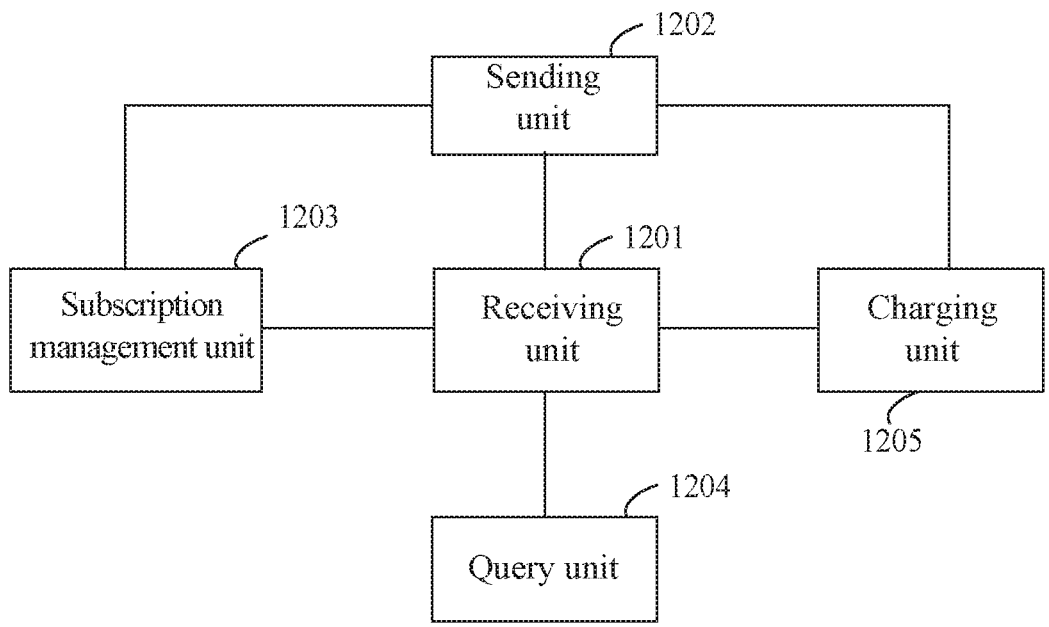
FIG. 12 is a block diagram of an apparatus for providing a big data analysis service according to another embodiment of the present application.

An embodiment of the present application provides an apparatus for providing a big data analysis service. As shown in FIG. 12, the apparatus includes a receiving unit

1201, a sending unit 1202, a subscription management unit 1203, a query unit 1204 and a charging unit 1205.

The receiving unit 1201 is configured to receive big data information generated by NWDA according to network operation and maintenance data.

The sending unit 1202 is configured to send the big data information to an application.

In an embodiment, the apparatus for providing a big data analysis service further includes the subscription management unit 1203. The subscription management unit 1203 is configured to receive a big data traffic subscription request or a cancellation subscription request from the application, send the big data traffic subscription request or the cancellation subscription request to the network data analytics. The big data traffic subscription request or the cancellation subscription request carries information about big data traffic.

In an embodiment, the subscription management unit 1203 is further configured to: after receiving the cancellation subscription request from the application, in response to determining that no other application subscribes to the big data traffic requested to be cancelled in the cancellation subscription request, carry a big data traffic cancellation indication in the cancellation subscription request sent to the network data analytics to instruct the network data analytics to uninstall a corresponding traffic analysis module.

In an embodiment, the apparatus for providing a big data analysis service further includes the query unit 1204. The query unit 1204 is configured to receive a query request sent by the application and forward the query request to the network data analytics. The query request carries big data traffic information to be queried by the application.

In an embodiment, the apparatus for providing a big data analysis service further includes the charging unit 1205. The charging unit 1205 is configured to perform charging when the sending unit sends the big data information to the application.

The apparatus for providing a big data analysis service may be disposed on an NEF.

Figure 13:
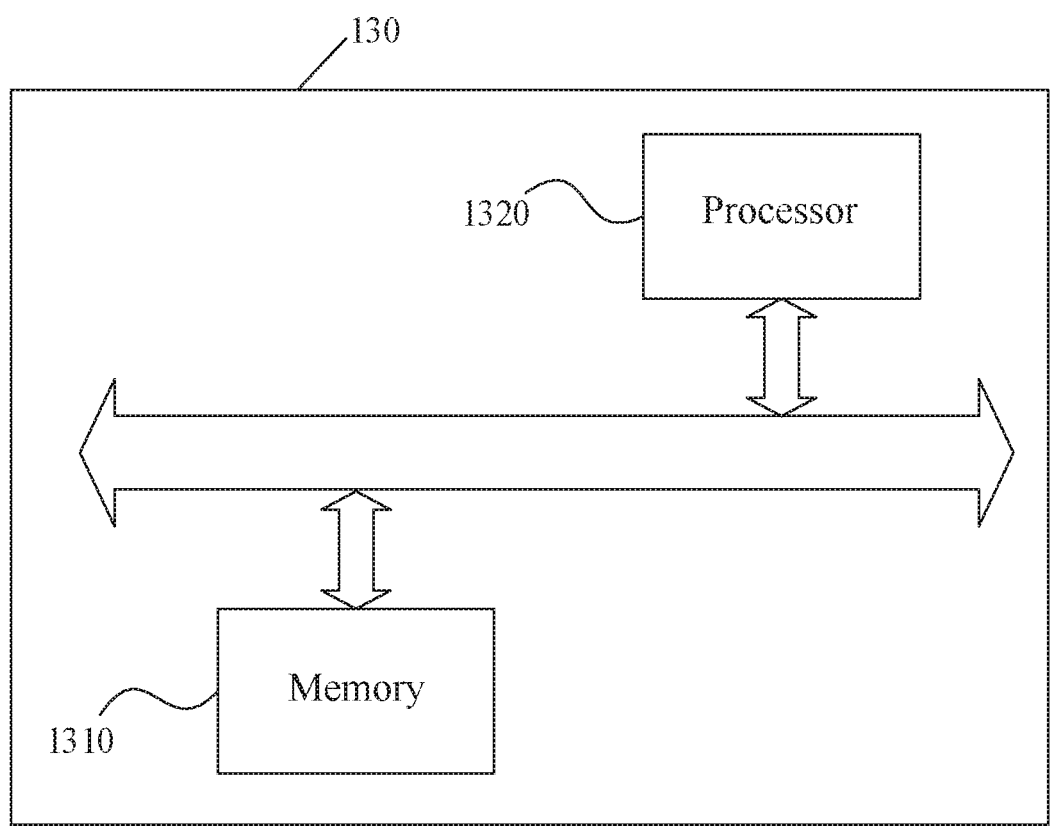
FIG. 13 is a block diagram of an apparatus for providing a big data analysis service according to another embodiment of the present application.

As shown in FIG. 13, an embodiment of the present application provides an apparatus 130 for providing a big data analysis service. The apparatus 130 includes a memory 1310 and a processor 1320. The memory 1310 stores a program which, when read and executed by the processor 1320, performs the method for providing a big data analysis service according to any one of the embodiments described above.

An embodiment of the present disclosure provides a computer-readable storage medium. The computer-readable storage medium is configured to store one or more programs executable by one or more processors for implementing the method for providing a big data analysis service according to any one of the embodiments described above.

The computer-readable storage medium includes a USB flash disk, a read-only memory (ROM), a random access memory (RAM), a mobile hard disk, a magnetic disk, an optical disk or another medium capable of storing program codes.

What is claimed is:

1. A method for providing a big data analysis service, comprising:
   generating, by network data analytics, big data information according to network operation and maintenance data, wherein an interface is arranged between the network data analytics and a network exposure function, and the network data analytics is configured to send the big data information to the network exposure function through the interface; and
   sending, by the network data analytics, the big data information to an application through the network exposure function,
   wherein the network data analytics and the network exposure function are network service units defined by third generation partnership project (3GPP).

2. The method for a big data analysis service of claim 1, further comprising:
   receiving, by the network data analytics, a big data traffic subscription request or a cancellation subscription request which is forwarded by the network exposure function from the application, and recording or updating big data traffic subscribed to by the application according to information about the big data traffic carried in the big data traffic subscription request or the cancellation subscription request.

3. The method for providing a big data analysis service of claim 1, before the generating, by the network data analytics, the big data information according to the network operation and maintenance data, further comprising:
   acquiring, by the network data analytics, the network operation and maintenance data from the network exposure function, or acquiring, by the network data analytics, the network operation and maintenance data from a plurality of network functions.

4. The method for providing a big data analysis service of claim 1, wherein sending the big data information to the application through the network exposure function by the network data analytics comprises:
   determining, by the network data analytics, that the big data information matches with big data traffic subscribed to by the application, and sending the big data information to the application through the network exposure function; or
   receiving, by the network data analytics, a query request sent by the application through the network exposure function, and sending the big data information requested to be queried by the application to the application through the network exposure function.

5. The method for providing a big data analysis service of claim 1, wherein the big data information comprises at least one of: cell-level information, subscriber-level information, session-level information or a subscriber mobility rule.

6. A non-transitory computer-readable storage medium, storing at least one program, wherein the at least one program is executable by at least one processor for implementing the method for providing a big data analysis service of claim 1.

7. An apparatus for providing a big data analysis service, disposed on a network data analytics, wherein the apparatus comprises a processor and a memory;
   wherein the memory stores processor-executable programs, and the processor-executable programs comprise:
   a big data information management unit, which is configured to generate big data information according to network operation and maintenance data, wherein an interface is arranged between the network data analytics and a network exposure function, and the network data analytics is configured to send the big data information to the network exposure function through the interface; and
   a sending unit, which is configured to send the big data information to an application through the network exposure function; and wherein the network data analytics and the network exposure function are network service units defined by third generation partnership project (3GPP).

8. The apparatus for providing a big data analysis service of claim 7, further comprising: a subscription management unit;
wherein the subscription management unit is configured to receive a big data traffic subscription request or a cancellation subscription request which is forwarded by the network exposure function from the application, and record or update big data traffic subscribed to by the application according to information about the big data traffic carried in the big data traffic subscription request or the cancellation subscription request.

9. The apparatus for providing a big data analysis service of claim 7, wherein the big data information management unit is further configured to acquire the network operation and maintenance data from the network exposure function, or acquire the network operation and maintenance data from a plurality of network functions.

10. The apparatus for providing a big data analysis service of claim 7, wherein the sending unit is configured to send the big data information to the application through the network exposure function by:
receiving a query request sent by the application through the network exposure function, and sending the big data information requested to be queried by the application to the application through the network exposure function; or
determining that the big data information matches with big data traffic subscribed to by the application, and sending the big data information to the application through the network exposure function.

11. The apparatus for providing a big data analysis service of claim 7, wherein the big data information comprises at least one of: cell-level information, subscriber-level information, session-level information or a subscriber mobility rule.

12. An apparatus for providing a big data analysis service, disposed on a network exposure function, wherein the apparatus comprises a processor and a memory;
wherein the memory stores processor-executable programs, and the processor-executable programs comprise:
a receiving unit, which is configured to receive big data information generated by network data analytics according to network operation and maintenance data, wherein an interface is arranged between the network data analytics and the network exposure function, and the network data analytics is configured to send the big data information to the network exposure function through the interface; and
a sending unit, which is configured to send the big data information to an application; and
wherein the network data analytics and the network exposure function are network service units defined by third generation partnership project (3GPP).

13. The apparatus for providing a big data analysis service of claim 12, further comprising: a subscription management unit; wherein:
the subscription management unit is configured to receive a big data traffic subscription request or a cancellation subscription request from the application, and send the big data traffic subscription request or the cancellation subscription request to the network data analytics, wherein the big data traffic subscription request or the cancellation subscription request carries information about big data traffic.

14. The apparatus for providing a big data analysis service of claim 13, wherein the subscription management unit is further configured to: after receiving the cancellation subscription request from the application, in response to determining that no other application subscribes to the big data traffic requested to be cancelled in the cancellation subscription request, carry a big data traffic cancellation indication in the cancellation subscription request sent to the network data analytics to instruct the network data analytics to uninstall a corresponding traffic analysis module.

15. The apparatus for providing a big data analysis service of claim 12, further comprising: a query unit;
wherein the query unit is configured to receive a query request sent by the application, and forward the query request to the network data analytics, wherein the query request carries big data traffic information requested to be queried by the application.

16. The apparatus for providing a big data analysis service of claim 12, further comprising: a charging unit;
wherein the charging unit is configured to perform charging when the sending unit sends the big data information to the application.

* * * * *